(12) United States Patent
Trevino et al.

(10) Patent No.: US 6,421,260 B1
(45) Date of Patent: Jul. 16, 2002

(54) SHUTDOWN CIRCUIT FOR A HALF-BRIDGE CONVERTER

(75) Inventors: Benito Trevino, Willoughby Hills; Melvin C. Cosby, Jr., Lakewood; Gordon Grigor, Cleveland Heights; Louis R. Nerone, Brecksville, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/742,948

(22) Filed: Dec. 20, 2000

(51) Int. Cl.⁷ .......................................... H02M 7/5387
(52) U.S. Cl. ...................................................... 363/98
(58) Field of Search ................................ 363/49, 56.02, 363/98, 132

(56) References Cited

U.S. PATENT DOCUMENTS

| | | | |
|---|---|---|---|
| 3,769,568 A | * 10/1973 | Hamilton et al. | |
| 4,249,111 A | * 2/1981 | Gluck | 315/360 |
| 4,586,120 A | * 4/1986 | Malik et al. | 363/49 |
| 4,652,986 A | * 3/1987 | Kolkman | 363/56 |
| 5,375,051 A | * 12/1994 | Decker et al. | 363/49 |
| 5,452,173 A | * 9/1995 | Brannon et al. | 361/94 |
| 5,636,111 A | * 6/1997 | Griffin et al. | 315/225 |
| 5,874,810 A | 2/1999 | Nerone | 315/248 |
| 5,877,595 A | 3/1999 | Nerone | 315/209 R |
| 5,914,570 A | 6/1999 | Nerone | 315/209 R |
| 5,917,289 A | 6/1999 | Nerone et al. | 315/209 R |
| 5,952,790 A | 9/1999 | Nerone et al. | 315/209 R |
| 5,986,410 A | 11/1999 | Nerone | 315/209 R |
| 6,018,220 A | 1/2000 | Nerone | 315/209 R |
| 6,051,934 A | 4/2000 | Nerone | 315/209 R |
| 6,057,648 A | 5/2000 | Neron et al. | 315/209 R |
| 6,075,687 A | * 6/2000 | Cheng et al. | 361/91.1 |
| 6,078,143 A | 6/2000 | Nerone | 315/209 R |
| 6,088,244 A | * 7/2000 | Shioya et al. | 363/97 |
| 6,111,363 A | 8/2000 | Nerone | 315/225 |
| 6,150,769 A | 11/2000 | Nerone et al. | 315/209 R |

* cited by examiner

Primary Examiner—Jeffrey Sterrett
(74) Attorney, Agent, or Firm—Fay, Sharpe, Fagan, Minnich & McKee, LLP

(57) ABSTRACT

A power supply circuit (100) configured to control operation of a load (135) including a converter (105, 110) configured to convert a DC signal to an AC signal, a drive circuit connected to the converter (105, 110) to control operation of the converter (105, 110), and a shutdown circuit (160) connected to the drive circuit to turn off the converter (105, 110). The shutdown circuit (160) includes a diode (190) and a switch (185).

20 Claims, 3 Drawing Sheets

SHUTDOWN CIRCUIT FOR A HALF-BRIDGE CONVERTER

BACKGROUND OF THE INVENTION

1. Field of the Invention

This application relates to an electrical circuit, and in particular, to a shutdown circuit for half-bridge converters.

2. Discussion of the Art

The on-off operation of half-bridge converters has traditionally been accomplished by analog signals. However, use of digital signals to control the on-off operation of loads, such as lamps, is now known in the art. In one approach, electromagnetic relay switches are used. Electromagnetic relays, however, are bulky due to their large size. They are also generally slow.

In another approach, solid state relays have been used. Solid state relays, however, are expensive. Further, the use of solid state relays decreases the efficiency of the circuit because of the power dissipation which occurs when the relay is on.

Accordingly, a need exists for a more efficient and less expensive way to control operation of loads using digital signals.

BRIEF SUMMARY OF THE INVENTION

An exemplary embodiment of the present invention concerns a power supply circuit configured to control operation of a load. The power supply circuit includes a converter configured to convert a DC signal to an AC signal, a drive circuit connected to the converter to control operation of the converter, and a shutdown circuit connected to the drive circuit to turn off the converter. The shutdown circuit includes a diode and a switch.

This circuit has a number of advantages over the prior art. The circuit is integrated and less expensive.

Another advantage resides in the fact that this power supply circuit is more efficient than the prior art circuits which utilize relays.

DETAILED DESCRIPTION OF THE PREFERRED EMBODIMENT

Figure 1:
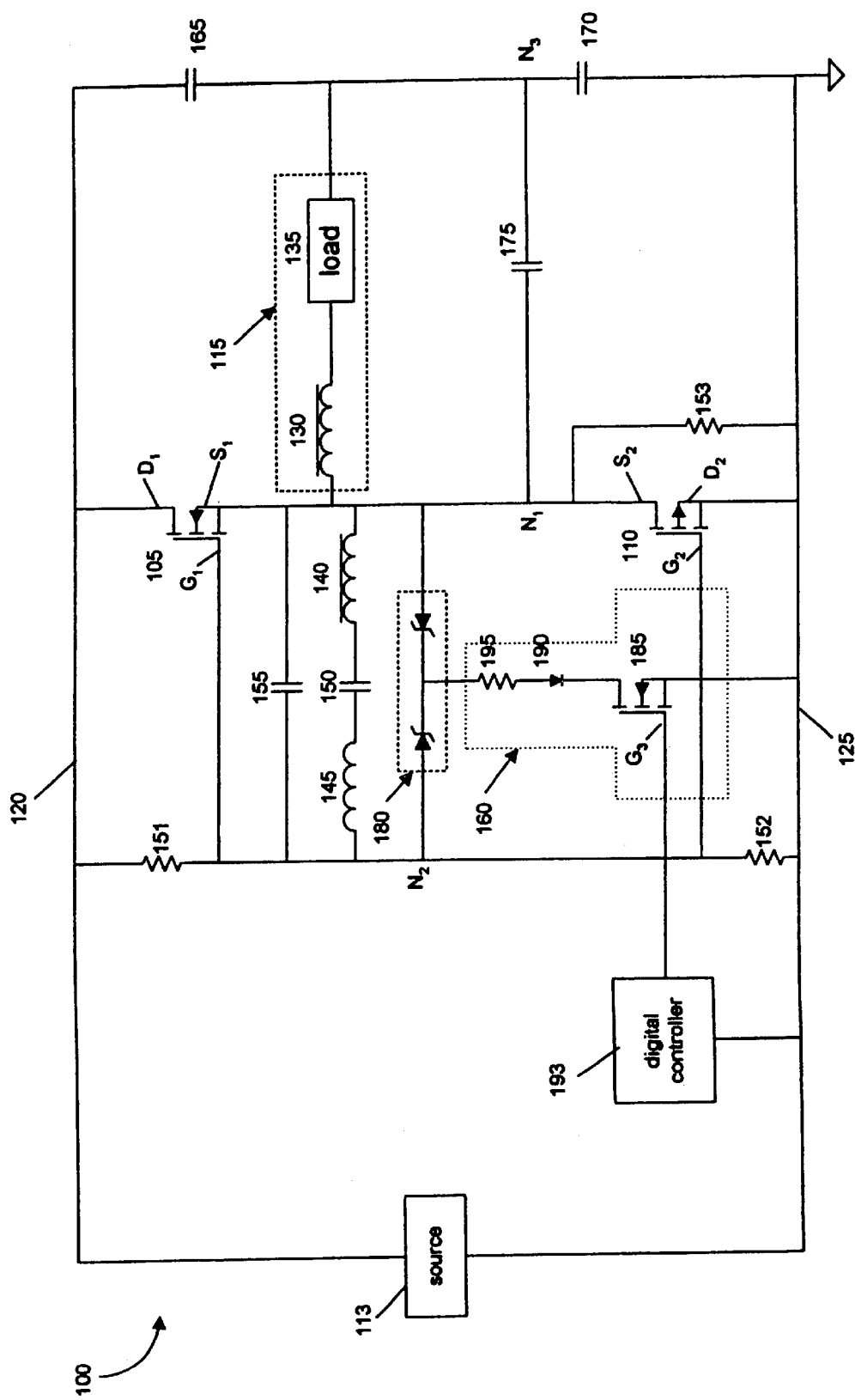
FIG. 1 is a schematic diagram of a power supply circuit embodying the present invention.

With reference to the Figures, several embodiments of the present invention are shown and will now be described. Like reference numerals are used to indicate the same element throughout the specification. FIG. 1 is a schematic diagram of a power supply circuit 100 embodying the present invention. A DC-to-AC converter or inverter, which includes first and second switches 105 and 110, respectively, converts DC current from a source 113 to AC current received by a load circuit 115.

The first and second switches 105 and 110 are complementary to each other in the sense, for instance, that the first switch 105 may be an n-channel enhancement mode device as shown, and the second switch 110 is a p-channel enhancement mode device. These are known as MOSFET switches.

Each of the first and second switches 105 and 110 has a respective gate (or control terminal) G1 or G2, respectively. The voltage from gate G1 to source (reference terminal) S1 of the first switch 105 controls the conduction state of that switch. Similarly, the voltage from gate G2 to source S2 of the second switch 110 controls the conduction state of that switch. As illustrated, sources S1 and S2 are connected together at the common node N1. With the gates G1 and G2 interconnected at the common control node N2, the voltage between the common control node N2 and the common node N1 controls the conduction states of both first and second switches 105 and 110. Drains D1 and D2 of the first and second switches 105 and 110 are connected to a bus conductor 120 and a reference conductor 125, respectively. The reference conductor 125 is shown for convenience as a ground.

The load circuit 115 includes a primary inductor 130 and a load 135, such as a lamp. The load 135 may be reactive or resistive. DC bus voltage $V_{BUS}$ exists between the bus conductor 120 and the reference conductor 125.

The DC-to-AC converter is coupled to a gate drive circuit or arrangement, which includes a driving inductor 140, a gate inductor 145, and a blocking capacitor 150. The gate drive circuit is coupled to a starting circuit comprised of three resistors 151, 152, and 153 and a decoupling capacitor 155. The resistors 151 and 152 are preferably at a high value (e.g., greater than 1 M ohm) to ensure that a digital shutdown circuit 160 draws a minimal amount of current when the load 135 is not drawing current. The standard bridge capacitors 165 and 170 are connected in parallel to the DC-to-AC converter and block DC current from flowing through the load 135. The bridge capacitors 165 and 170 also maintain their commonly connected node N3 at about one half bus voltage $V_{BUS}$. A snubber capacitor 175 is preferably connected between the commonly connected node N3 and the common node N1 to deplete the energy in the primary inductor 130.

A bidirectional voltage clamp 180, comprised of back-to-back Zener diodes connected at their common n-type terminals, is located between common control node N2 and common node N1. The bi-directional voltage clamp 180 clamps positive and negative excursions of gate-to-source voltage ratings of the first and second switches 105 and 110 so that their gate-to-source maximum ratings are not exceeded.

Connected between the common n-type terminals of the back-to-back Zener diodes 180 and the reference conductor 125 is the digital shutdown circuit 160. The digital shutdown circuit 160 includes a shutdown switch 185 and a blocking diode 190. The shutdown switch 185 is preferably an n-channel type transistor, such as an NMOS. A control terminal of the transistor is capable of receiving a digital signal from a digital controller 193. The digital shutdown circuit 160 also preferably includes a current limiting resistor 195. The current limiting resistor 195 protects against over current of the shutdown switch 185. Further, the use of a current limiting resistor 195 allows a smaller shutdown switch 185 to be utilized, making the digital shutdown circuit 160 even more cost efficient. The blocking diode 190 is used to prevent reverse current through the shutdown switch 185.

The power supply circuit 100 operates as follows. The starting circuit provides a path for input from a source to start inductor action. The blocking capacitor 150 becomes initially charged upon energizing of the source, via the resistors 151, 152, and 153. At this instant, the voltage across the blocking capacitor 150 is zero. During the starting process, the driving inductor 140 and the primary inductor 130 act essentially as a short circuit due to the relatively long time constant for charging of the blocking capacitor 150. Upon initial bus energizing, the voltage on the common node N1 is approximately ⅓ of bus voltage $V_{BUS}$ with resistors 151, 152, and 153 being of equal value, for instance. In this manner, the blocking capacitor 150 becomes increasingly charged, from left to right, until it reaches the threshold voltage of the gate-to-source voltage of the first switch 105 (e.g., 2–3 volts). At this point, the first switch 105 switches into its conduction mode, which then results in current being supplied by the first switch 105 to the load circuit 115. In turn, the resulting current in the load circuit 115 causes regenerative control of the first and second switches 105 and 110 in the manner described above.

During steady state operation of the power supply circuit 100, the voltage of the common node N1 between the first and second switches 105 and 110 becomes approximately ½ of bus voltage $V_{BUS}$. The voltage at the common control node N2 also becomes approximately ½ of bus voltage $V_{BUS}$ so that the blocking capacitor 150 cannot again, during steady state operation, become charged and create another starting pulse for turning on the first switch 105. During steady state operation, the capacitive reactance of the blocking capacitor 150 is much smaller than the inductive reactance of the driving inductor 140 and the gate inductor 145 so that the blocking capacitor 150 does not interfere with the operation of the driving inductor 140 and gate inductor 145.

The gate drive circuit controls the conduction states of both the first and second switches 105 and 110. The driving inductor 140 of the gate drive circuit is mutually coupled to the primary inductor 130 in such a manner that a voltage is induced therein which is proportional to the instantaneous rate of change of an AC load current. The driving inductor 140 is further connected at one end to the common node N1. The driving inductor 140 provides the driving energy for operation of the gate drive circuit. The gate inductor 145, which is serially connected to the blocking capacitor 150 and the common control node N2, is used to adjust the phase angle of the gate-to-source voltage appearing between common control node N2 and common node N1.

The decoupling capacitor 155 between the common control node N2 and the common node N1 is preferably provided to predictably limit the rate of change of the gate-to-source voltage between the common control node N2 and the common node N1. This beneficially assures, for instance, a dead time interval in the switching modes of the first and second switches 105 and 110, wherein the first and second switches 105 and 110 are off between the times of either the first switch 105 or the second switch 110 being turned on. Together, the decoupling capacitor 155 and the gate inductor 145 form a second resonant circuit.

The digital shutdown circuit 160 operates as follows. When a digital signal from a digital controller 193 applied to a gate G3 of the shutdown switch 185 goes to a high potential with respect to the reference conductor 125, the shutdown switch 185 is turned on. This creates a low impedance conduction path between the common control node N2 and the common node N1 to the reference conductor 125 via the back-to-back Zener diodes and the digital shutdown circuit 160. This results in the voltage from the gate G1 to the source S1 of the first switch 105 and the voltage from the gate G2 to the source S2 of the second switch 110 both being at approximately the same potential. Thus, the first and second switches 105 and 110 are turned off, and the load 135 is also shutdown (i.e., turned off).

The load 135 to stays turned off until the digital signal applied to the gate G3 of the shutdown switch 185 goes to a low potential with respect to the reference conductor 125. When the digital signal applied to the gate G3 goes to a low potential, the shutdown switch 185 is turned off, thereby allowing the back-to-back Zener diodes 180 to operate under their normal operating conditions, as described above.

Figure 2:
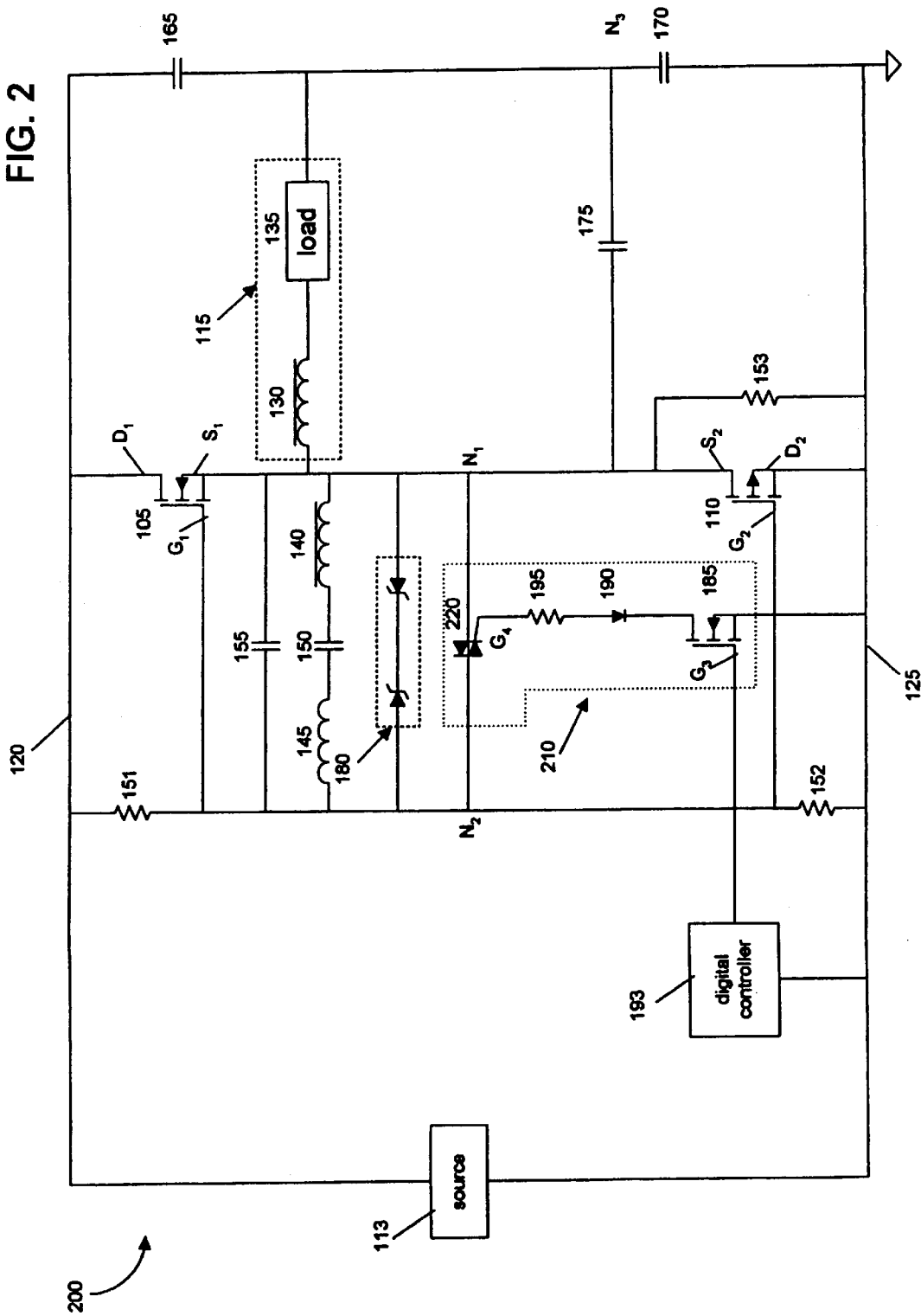
FIG. 2 is a schematic diagram of a second power supply circuit embodying the present invention.

FIG. 2 is a schematic diagram of a second power supply circuit 200 embodying the present invention. The power supply circuit 200 uses the identical components and functions the same way as the power supply circuit 100 of FIG. 1, with two exceptions. First, the back-to-back Zener diodes which make up the bi-directional voltage clamp 180 may be connected at either their common n-type or their common p-type terminals. Second, the digital shutdown circuit 210 of the power supply circuit 200 contains one additional element, namely a triac 220. The triac 220 is connected between the common control node N2 and common node N1. In the power supply circuit 200, the shutdown switch 185 is connected between a gate G4 of the triac 220 and the reference conductor 125 rather than between the common n-type terminals of the bi-directional voltage clamp 180, as in the power supply circuit 100 of FIG. 1.

Figure 3:
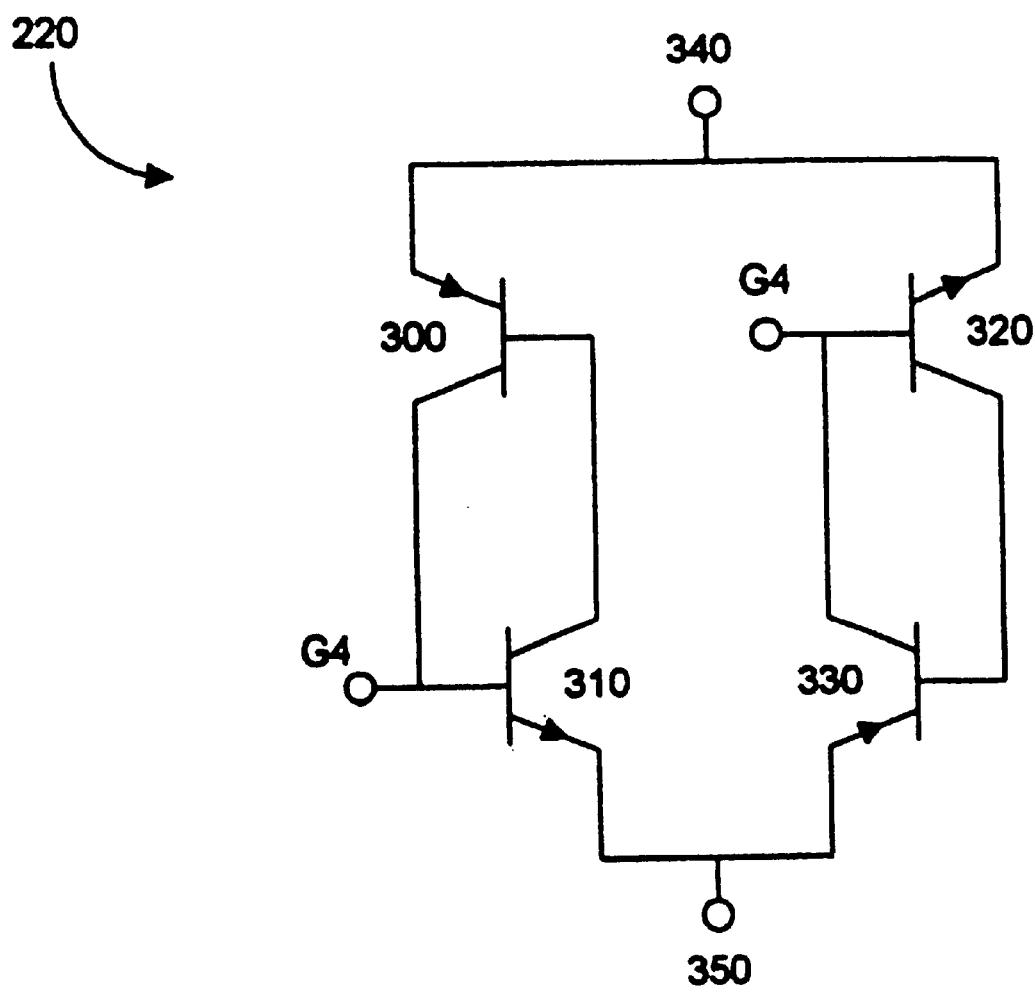
FIG. 3 is a schematic diagram of the equivalent circuit of the triac used in the second power supply circuit of FIG. 2.

An equivalent circuit of the triac 220 is depicted in FIG. 3. The triac 220 comprises four internal transistors 300, 310, 320, and 330 and two internal cathodes 340 and 350.

Referring to FIGS. 2 and 3, the digital shutdown circuit 210 operates as follows. When the digital signal applied to the gate G3 of the shutdown switch 185 goes to a high potential with respect to the reference conductor 125, the shutdown switch 185 is turned on. This creates a low impedance conduction path between the gate G4 of the triac 220 and the reference conductor 125. Thus, the internal transistors 300 and 330 are turned on and provide a low impedance conduction path between each of the cathodes 340 and 350 to the reference conductor 125. The cathodes 340 and 350 are at approximately the same potential which, like the gates G1 and G2 in the DC-to-AC converter, forces both the first and second switches 105 and 110 to turn off and the load 135 to shutdown.

Conversely, when the digital signal goes to a low potential with respect to the reference conductor 125, the shutdown switch 185 goes into its off state. Thus, the four internal transistors 300, 310, 320, and 330 in the triac 220 turn off, and the triac 220 functions as an open circuit, thereby allowing the power supply circuit 200 to function as if the digital shutdown circuit 210 does not exist.

In summary, the present invention makes known power supply circuitry integrally compatible with digital communication protocols without the need for relaying switches at the inputs. More specifically, the present invention provides a manner of efficiently using integrated circuit components to turn a lamp off using a digital signal. The invention is less expensive and does not affect the overall efficiency of the power supply circuit since the digital shutdown circuit draws a negligible amount of power when the converter is turned off.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A power supply circuit, configured to control operation of a load, comprising:

(a) a converter configured to convert a DC signal to an AC signal, the converter comprising a pair of switches serially connected between a bus conductor at a DC bus voltage and a reference conductor, a voltage between a reference terminal and a control terminal of each switch determining the conduction state of the associated switch, the respective reference terminals of the switches being connected together at a common node through which the AC signal current flows, and the respective control terminals of the switches being connected together at a control node;

(b) a drive circuit connected to the converter to control operation of the converter, the drive circuit comprising a driving inductor having a voltage induced therein that is proportional to an instantaneous rate of change of the AC signal current, the driving inductor providing a driving energy for operation of the drive circuit, and the drive circuit controlling the conduction states of the switches; and (c) a shutdown circuit connected to the drive circuit and configured to directly receive a digital signal to at least one of selectively turn off or allow normal operation of the converter, the shutdown circuit comprising a diode and a switch, wherein a low impedance conduction path is provided between the control node and the common node to the reference conductor thereby resulting in the control terminals of the switches being at approximately the same potential as the reference terminals, and the load is turned off and minimal current is drawn from the DC signal when the converter is turned off.

2. The converter circuit of claim 1, wherein the switch of the shutdown circuit is a transistor, a control terminal of the transistor capable of receiving the digital signal.

3. The power supply circuit of claim 2, wherein the transistor is an n-channel type transistor.

4. The power supply circuit of claim 1, wherein the shutdown circuit further comprises a resistor.

5. The power supply circuit of claim 1, wherein the load is resistive.

6. The power supply circuit of claim 1, wherein the load is reactive.

7. The power supply circuit of claim 1, wherein the load is a lamp.

8. The power supply circuit of claim 1, wherein the converter comprises first and second switches serially connected between a bus conductor and a reference conductor by a common node through which AC current flows, the first and second switches each connected to a control node and a reference node, a voltage between the control node and the reference node determining a conduction state of the switches.

9. The power supply circuit of claim 1, further comprising a self-starting circuit coupled to the drive circuit for providing a path for an AC current.

10. A power supply circuit configured to control operation of a load, comprising:

(a) a self-starting circuit coupled to a source for providing a path for an AC current;

(b) a gate drive arrangement operatively coupled to the self-starting circuit for controlling a converter, the converter comprising first and second switches serially connected between a bus conductor and a reference conductor by a common node through which AC current flows, the first and second switches each connected to a control node and a reference node, a voltage between the control node and the reference node determining a conduction state of the switches;

(c) a load circuit coupled to the converter, the converter inducing the AC current in the load; and (d) a shutdown circuit coupled between the common node and the control node configured to directly receive a digital signal to selectively turn off the converter switches by providing a low impedance path between the common node and the control node thereby resulting in the control node being at approximately the same potential as the reference node, wherein the load circuit is turned off and minimal current is drawn from the source when the converter switches are turned off.

11. The power supply circuit of claim 10, wherein the shutdown circuit comprises a diode and a switch.

12. The converter circuit of claim 11, wherein the switch of the shutdown circuit is a transistor, a control terminal of the transistor capable of receiving the digital signal.

13. The power supply circuit of claim 12, wherein the transistor is an n-channel type transistor.

14. The power supply circuit of claim 10, wherein the digital shutdown circuit comprises a resistor.

15. The power supply circuit of claim 10, wherein the load is resistive.

16. The power supply circuit of claim 10, wherein the load is reactive.

17. The power supply circuit of claim 10, wherein the load circuit comprises an inductor connected in series with a lamp.

18. The power supply circuit of claim 10, further comprising a voltage clamp coupled to the gate drive arrangement, a common terminal of the voltage clamp coupled to the shutdown circuit.

19. The power supply circuit of claim 10, wherein the shutdown circuit further comprises a triac coupled between the common control node and common node.

20. A method of supplying power to a load, comprising:

(a) converting a DC signal to an AC signal with a converter, the converter comprising first and second switches serially connected between a bus conductor and a reference conductor by a common node through which AC current flows, the first and second switches each connected to a control node and a reference node, a voltage between the control node and the reference node determining a conduction state of the switches;

(b) controlling operation of the converter with a drive circuit connected to the converter, the drive circuit comprising a driving inductor having a voltage induced therein that is proportional to an instantaneous rate of change of the AC current, the driving inductor providing a driving energy for operation of the drive circuit, and the drive circuit controlling the conduction states of the first and second switches; and (c) directly receiving a digital signal for at least one of selectively turning off or allowing normal operation of the converter with a shutdown circuit connected to the drive circuit, the shutdown circuit comprising a diode and a switch, wherein a low impedance conduction path is provided between the control node and the common node to the reference conductor thereby resulting in the control node being at approximately the same potential as the reference node, and the load is turned off and minimal current is drawn from the DC signal when the converter is turned off.

* * * * *